(12) United States Patent
Guering et al.

(10) Patent No.: US 11,084,588 B2
(45) Date of Patent: Aug. 10, 2021

(54) AIRCRAFT PILOT SEAT

(71) Applicant: Airbus Operations SAS, Toulouse (FR)

(72) Inventors: Bernard Guering, Montrabe (FR); Laurent Saint-Marc, Montaigut sur Save (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 317 days.

(21) Appl. No.: 16/224,071

(22) Filed: Dec. 18, 2018

(65) Prior Publication Data

US 2019/0185165 A1    Jun. 20, 2019

(30) Foreign Application Priority Data

Dec. 19, 2017    (FR) .................................... 1762505

(51) Int. Cl.
  *B64D 11/06*    (2006.01)
  *B64D 25/08*    (2006.01)
  *B64D 25/04*    (2006.01)
  *B60N 2/00*    (2006.01)

(52) U.S. Cl.
  CPC ............ *B64D 11/0629* (2014.12); *B60N 2/00* (2013.01); *B64D 11/06* (2013.01); *B64D 11/0689* (2013.01); *B64D 25/04* (2013.01); *B64D 25/08* (2013.01); *B64D 11/0627* (2014.12)

(58) Field of Classification Search
  CPC .... B64D 25/04; B64D 25/08; B64D 11/0629; B64D 11/0689; B64D 11/0639; B64C 1/24; B64C 1/32; A47C 12/02; A47C 7/62; E06C 9/00; E06C 9/085; E06C 1/56
  See application file for complete search history.

(56) References Cited

U.S. PATENT DOCUMENTS

| 118,096 | A | * | 8/1871 | Bergman | ............... A47C 12/02 182/33.4 |
| 2,743,861 | A | * | 5/1956 | Mattis | ................... E04F 11/062 182/95 |
| 3,424,409 | A | * | 1/1969 | Stanley | .................. B64D 25/08 244/122 R |
| 4,541,208 | A | * | 9/1985 | Vesperman | ........... E04F 11/062 182/77 |

(Continued)

FOREIGN PATENT DOCUMENTS

| CN | 202184454 | U | * | 4/2012 |
| FR | 2916423 | A1 |  | 11/2008 |

(Continued)

OTHER PUBLICATIONS

French Search Report; priority document.

*Primary Examiner* — Richard R. Green
*Assistant Examiner* — Madison Elizabeth Dittner
(74) *Attorney, Agent, or Firm* — Greer, Burns & Crain, Ltd.

(57) ABSTRACT

A pilot's seat offering an evacuation device. The seat comprises a ladder fixed to the rear of the back and covered by a detachable cover associated with the seat and deployable between a storage position retracted inside the cover and a deployed evacuation position, in which case the cover is detached. Thus, the evacuation device is incorporated harmoniously into the seat which offers a solid base for the evacuation ladder.

14 Claims, 7 Drawing Sheets

(56) References Cited

U.S. PATENT DOCUMENTS

| | | | | |
|---|---|---|---|---|
| 5,875,870 | A * | 3/1999 | Lee | A62B 5/00 182/70 |
| 7,937,886 | B2 * | 5/2011 | Bernard | A01M 1/2011 43/131 |
| 8,967,538 | B2 * | 3/2015 | Guering | B64D 11/0689 244/118.5 |
| 2008/0290714 | A1 | 11/2008 | Barrou | |
| 2016/0236765 | A1 | 8/2016 | Auriac et al. | |

FOREIGN PATENT DOCUMENTS

| | | |
|---|---|---|
| FR | 3032420 A1 | 8/2016 |
| GB | 813692 A | 5/1959 |
| GB | 2175499 A | 12/1986 |
| WO | 9523540 A1 | 9/1995 |

* cited by examiner

AIRCRAFT PILOT SEAT

CROSS-REFERENCES TO RELATED APPLICATIONS

This application claims the benefit of the French patent application No. 1762505 filed on Dec. 19, 2017, the entire disclosures of which are incorporated herein by way of reference.

BACKGROUND OF THE INVENTION

The present invention relates to an evacuation device of an aircraft cockpit integrated into a seat of the flight deck, and also to the aircraft equipped with such a seat In the event of evacuation of an aircraft for carrying passengers and/or freight, the cockpit comprises an evacuation hatch enabling the pilot, copilot, or any other crew member or other person to get out of the cockpit in order to access the exterior. The hatch is often positioned in the upper area of the front part of the aircraft, above the flight deck.

Patent FR3032420, filed on 11 Feb. 2015 by the present applicant, relates to an evacuation opening aligned with the flight deck. There is no description as to how the pilot reaches the opening. Indeed, in general, he uses whatever purchase is offered by the interior environment of the cockpit, with no particular device to assist him in reaching the hatch being available to him. In point of fact, when such a situation arises, evacuation conditions are not optimal: the pilot may be injured, there may be poor visibility owing to the presence of thick smoke, etc.

SUMMARY OF THE INVENTION

An object of the present invention is to propose an evacuation device for an aircraft cockpit that enables any person present in the cockpit at the time of evacuation to leave the cockpit without difficulty.

To this end, the present invention proposes an aircraft pilot's seat comprising a seat part, a back provided with a headrest, characterized in that a ladder is fixed to the rear of the back and covered by a detachable cover associated with the seat and deployable between a storage position retracted inside the cover and a deployed evacuation position, in which case the cover is detached.

Thus, an evacuation device is incorporated harmoniously into the seat which offers a solid base for the evacuation ladder.

The invention envisages at least one of the following optional features, taken individually or in combination.

The ladder, provided with uprights comprising tubes nested in one another, is telescopic.

The tubes are locked relative to one another by a locking lug inserted in a corresponding opening in the uprights.

The ladder is deployed automatically, and the triggering of deployment is activated by a mechanical, electrical, magnetic or hydraulic control device.

The cover comprises an opening handle associated with the control device such that removal of the cover triggers the control device.

The cover pivots about an axis Z in the lower part of the back, the opening handle being connected to a latch fixed to one of the rungs of the ladder in order to hold the cover in place, and allowing the unlocking of the rotation of the cover, the amplitude of which is limited by a cable retaining the cover in a position offering access to the rear of the back.

The ladder is mounted such as to be articulated in rotation at the upper end of the back, the ladder being held in a storage position by a locking system of the ladder.

The headrest is mounted such as to be articulated in rotation relative to the back of the seat in order to tilt in the direction of the seat part and to release the upper end of the back, the headrest being held in a position of use of the seat by a locking system of the headrest.

The control device triggers tilting of the headrest and of the ladder.

The lug is positioned such that, with the tilting in rotation of the ladder, the lug withdraws therefrom and releases the uprights in order to allow the ladder to deploy.

At least one spring is inserted inside the uprights such that it is compressed when the locking lug is in place in order for the release of the lug to enable the spring to relax, thereby causing the sliding of the uprights relative to one another.

The articulation respectively of the headrest and of the ladder on the back comprises at least one torsion spring in compression which entrains the headrest in rotation when the locking system releases the headrest and the ladder.

The locking system of the headrest comprises a cable, one end of which is connected to the headrest and the other end of which is connected to a retention device, and the locking system of the ladder comprises a cable, one end of which is connected to the ladder and the other end of which is connected to said retention device, the cables being completely extended when the ladder is in a storage position and the headrest is in a use position, the retention device comprising a system that makes it possible to release the end held by the retention device when a control device is actuated.

The present invention also relates to an aircraft comprising a flight deck equipped with a seat having at least one of the preceding optional features, taken individually or in combination, and an evacuation hatch is arranged in line with the seat and the size of the deployed ladder is dimensioned in accordance with the height between the hatch and the pilot's seat.

BRIEF DESCRIPTION OF THE DRAWINGS

Further objects, advantages and features of the invention will become apparent on reading the following description of the invention, which is given by way of nonlimiting example with reference to the appended drawings, in which.

DETAILED DESCRIPTION OF THE PREFERRED EMBODIMENTS

Figure 1:
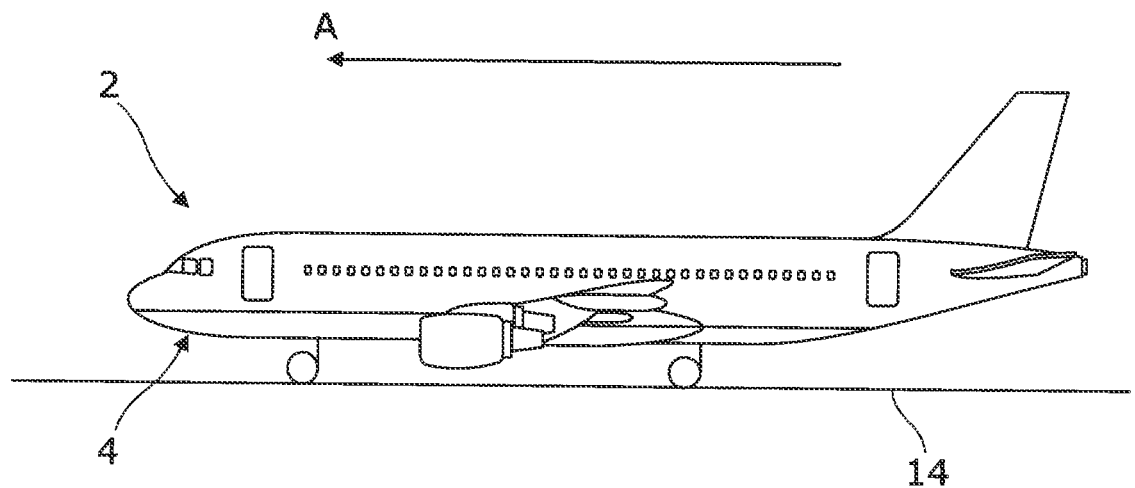
FIG. 1 shows a side view of an aircraft capable of being equipped with a seat according to the present invention.
Figure 2:
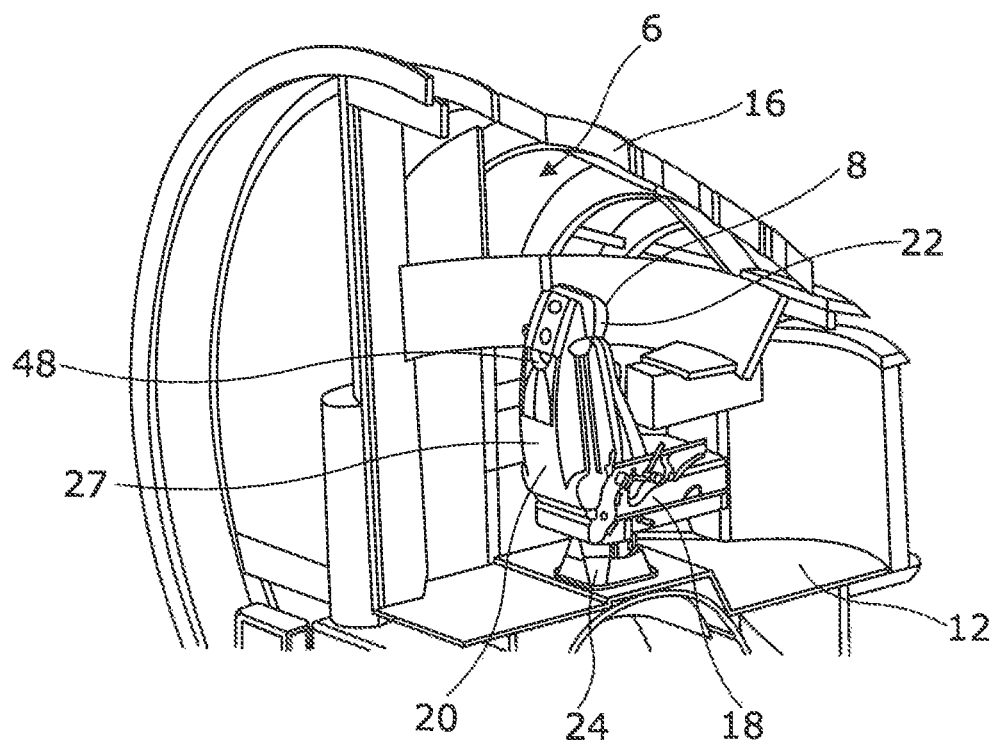
FIGS. 2 to 4 show perspective views of the flight deck equipped with a seat according to the present invention, in which, respectively, in FIG. 2 the evacuation device is in a retracted, storage position inside a cover, in FIG. 3 the cover has been removed, and in FIG. 4 the ladder is deployed in the course of an evacuation.
Figure 3:
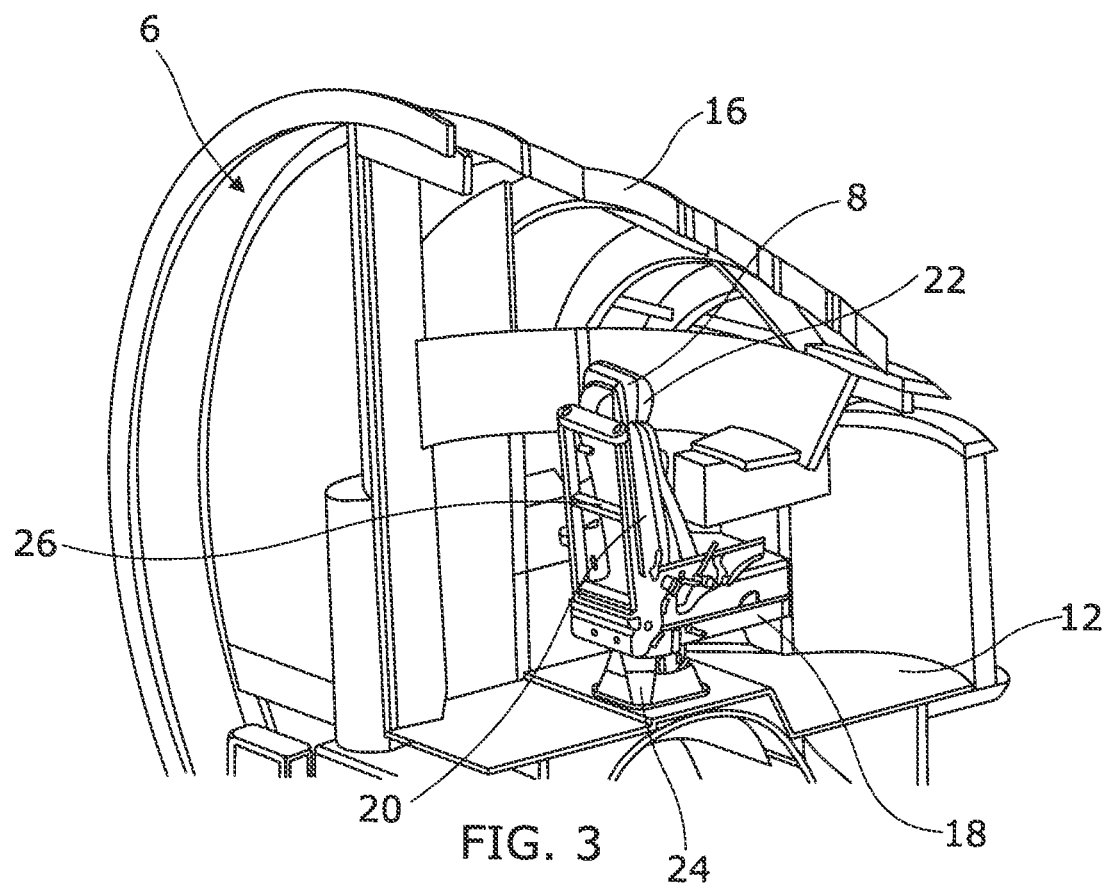
Figure 4:
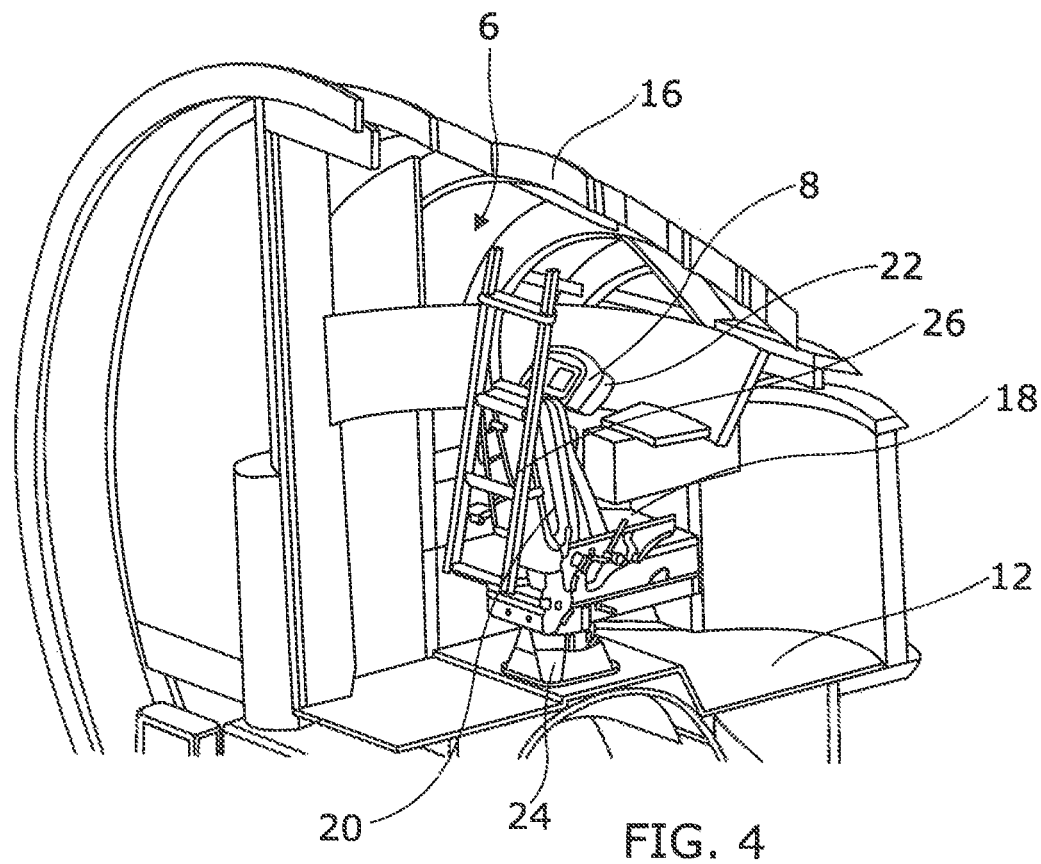
Figure 5:
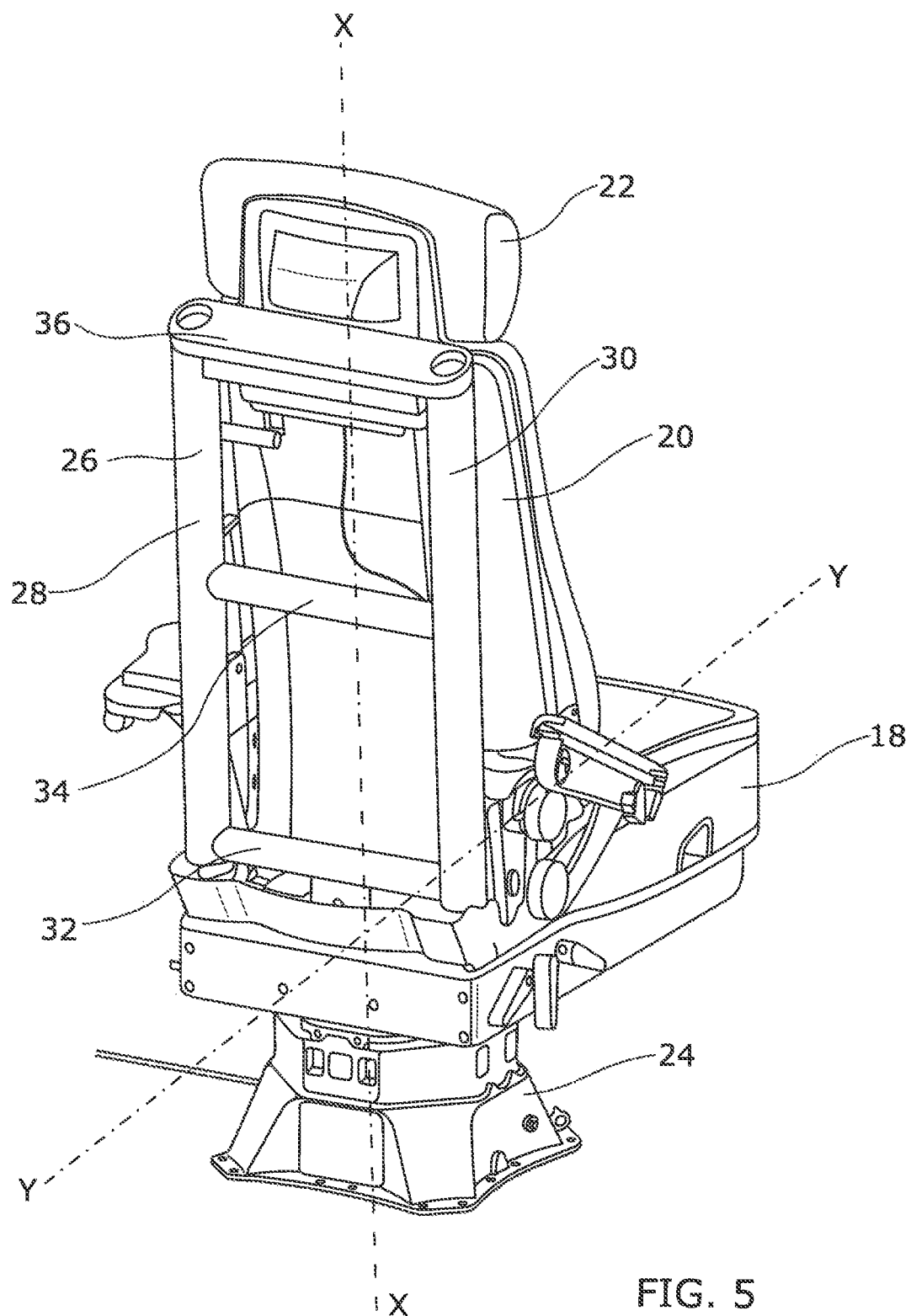
FIG. 5 shows a rear perspective view of a seat according to the present invention, in which the cover has been removed and in which the evacuation device is in a retracted, storage position.

FIGS. 1 to 4 show an aircraft 2 having a front part 4 comprising a flight deck 6. The flight deck 6 is provided with at least one seat 8, intended for a pilot, mounted on a floor 12. In the remainder of the description, the term "pilot" denotes the pilot, copilot or any person assisting the pilot within the flight deck.

In the remainder of the description, also, it is assumed that the aircraft 2 is on a ground 14 defining a horizontal plane. The floor 12 is arranged parallel to the ground 14, i.e., in a horizontal plane. The floor 12 is a floor on which crew members (pilot, copilot, pilot assistant, cabin crew, etc.) and/or any other person will walk. A vertical direction is a direction perpendicular to the horizontal planes of the ground 14 and of the floor 12.

The terms "front" and "rear" are used with reference to the direction of travel of the aircraft 2 in flight, represented by arrow A in FIG. 1.

Very generally, as shown in FIGS. 1 to 4, the front part 4 comprises an evacuation hatch 16 to enable the pilot, copilot or any other crew member or other person to gain access to the exterior of the aircraft. A knotted rope or any other equivalent device also makes it possible to reach the ground 14 from the hatch 16.

The present invention may apply to any other configuration of aircraft in which the flight deck is not located in the front part. It suffices for the evacuation hatch to be positioned in line with the flight deck and, for example, in line with a pilot's seat equipped with the evacuation device in question.

As shown in FIGS. 2 to 4, 5, 6, 9 and 10, the seat 8 comprises a seat part 18 and a back 20, at the top of which there is a headrest 22. The seat part 18 rests on the floor 12 by means of a height-adjustable base 24. In the remainder of the description, the back 20, the headrest 22 and the base 24 are arranged in the same direction X-X, which corresponds to the vertical position in FIG. 5, and the seat part 18 is arranged in a direction perpendicular to the back 20. Conventionally, the angle between the seat part 18 and the back 20 can be adjusted: thus, the pilot is able to choose the rake of the back for optimum comfort. The seat can also pivot about itself, about the axis X-X. In the remainder of the description, the seat part of the seat is positioned in a longitudinal direction Y-Y of the aircraft, perpendicular to the axis X-X.

To facilitate the evacuation of the pilot in the event of an emergency, an evacuation device is incorporated into the seat 8: the seat 8 comprises a deployable ladder 26 fixed to the rear of the back 20. The ladder 26 is deployed from a retracted, storage position illustrated in FIGS. 2, 3, 5 and 6, in which it has a height and a width corresponding to those of the back 20, enabling it to be encased entirely inside a shell 27 on the rear of the seat, forming a cover into a deployed, evacuation position illustrated in FIGS. 4, 9 and 10, in which it allows the evacuation hatch 16 to be reached.

In the embodiment illustrated, mechanical entrainment means are provided for entraining the ladder to be deployed; the ladder is held in a retracted position with the aid of locking means for the ladder in a retracted position, one embodiment of which is given below. According to a particular embodiment, in order to facilitate the use thereof, upon its deployment, the ladder is able to pivot in order to take up a position forming an angle relative to the axis X-X. In order to cause the ladder to pivot it is necessary to tilt the headrest. In the same manner as for the deployment of the ladder, means for entraining the ladder in rotation and the headrest in a tilting motion are provided, as are means for locking the pivoting of the ladder and the tilting of the headrest. As will be seen in the following embodiment, control means allow automatic deployment of the ladder to be triggered through action on the locking means provided in order to enable the entrainment means to operate.

In the embodiment illustrated in FIGS. 2 to 14, the ladder 26 is telescopic: the ladder 26 comprises two uprights 28, 30 and at least three rungs 32, 34, 36. Each upright 28, 30 is constituted by at least two tubes nesting in one another and sliding relative to one another. The tube may, for example, be cylindrical, of circular cross section, or, alternatively, parallelepipedal, of square or rectangular cross section, or may have any other shape that enables the tubes to slide in one another. In the embodiment illustrated, each upright 28 or 30, respectively, comprises three tubes, an exterior tube 28a, an intermediate interior tube 28b, and an interior tube 28c, respectively an exterior tube 30a, an intermediate interior tube 30b and an interior tube 30c (see FIGS. 8, 9 and 12). The intermediate interior tubes 28b, 30b are connected by a rung 36 at one of their ends, called, hereinafter, upper rung 36. The interior tube 28c, 30c is inserted inside the intermediate interior tube 28b, 30b, and the latter are inserted inside the exterior tube 28a, 30a. They are immobilized in translation by a locking device having the form of a lug 38 (visible in FIGS. 8 and 12). The lug 38 corresponds to the means for locking the ladder in a retracted position. Other embodiments of the locking means could be used. The interior, intermediate interior and exterior tubes have an opening 39, which, when they are in correspondence, enable the lug 38 to slide therein, said lug thus locking the sliding of one tube relative to another. In the embodiment illustrated, the lug has a cylindrical form of circular cross section and the openings are of corresponding circular form. The lug 38 is positioned such that when the ladder is in a retracted, storage position, the interior tubes 28c, 30c are inside the intermediate interior tubes 28b, 30b and the intermediate interior tubes 28b, 30b are inside the exterior tubes 28a, 30a. The upper rung 36 then bears on the ends of the exterior tubes 28*a*, 30*a*; the end of the interior tubes 28*c*, 30*c* are flush with the exterior surface of the rung 36, that is to say, the surface of the rung opposite that which bears on the exterior tubes of the ladder.

The exterior tubes 28*a*, 30*a* are open at one of the ends, and more precisely the upper ends when the ladder is in place on the seat, in order to allow the insertion of the intermediate interior and interior uprights, and are closed at the other end, that is to say, the lower ends, when the ladder is in place on the seat. When the ladder 26 is in place against the back 20 of the seat, the upper rung 36 connecting the interior tubes is placed above the rungs 32, 34 connecting the exterior tubes, called, respectively, lower and intermediate rungs.

Any other embodiment of deployable ladder is possible, such as, for example, a ladder that can be folded into at least two parts.

According to the embodiment illustrated, the ladder can be deployed automatically. Each upright 28, 30 comprises a means for entraining the deployment of the ladder of a spring, ram or other type. In the embodiment illustrated, the entrainment means is a spring 40 (visible in FIGS. 8 and 12), one of the ends of which bears against the lower end of the exterior tubes and the other end of which bears against the closed lower end of the interior tubes when they are inserted in the exterior tubes. When the ladder is in a retracted position, the spring 40 is compressed and tends to push the interior tubes towards the exterior of the exterior tubes, i.e., upwards, but the locking lug 38 keeps the spring compressed and the intermediate interior and interior tubes in a retracted position.

When the ladder is in a retracted, storage position, the lug 38 retains the interior and intermediate interior tubes inside the exterior tube, the spring being compressed. When the lug 38 is withdrawn, the spring 40 pushes the interior tubes towards the exterior, which enables the ladder to deploy. The features of the spring 40 are chosen such that, once released, it relaxes in order to enable the ladder to achieve the deployed evacuation position. In the embodiment illustrated, the deployed position is such that the distance between the upper rung 36 and the intermediate rung 34 corresponds to a greater length and, in the embodiment illustrated, double the distance between the upper rung 36 and the upper end 42 of the back. In fact, in a deployed position, as will be seen below, the upper end 42 of the back offers a supplementary rung between the upper rung 36 and the intermediate rung 34.

According to an alternative, the ladder 26 could be deployed manually.

The cover 27 has the form of a shell that makes it possible to cover the ladder 26 and to form a unit with the seat 8 and the headrest 22. The lower end 44 of the cover is fixed in an articulated manner, in rotation about a horizontal axis Z (visible in FIG. 6). The cover 27 comprises a semi-cylindrical recess 46 of circular cross section, inside which the axis Z is accommodated: the cover 27 rests under gravity on the axis Z. In the embodiment illustrated, the axis Z is formed by the lower rung 32 of the ladder 26. It could also form part of the back or, alternatively, of the seat part, or even of any other element of the seat. The axis Z, the lower end of the ladder, here, at the lower rung 32, and the lower end 44 of the cover are at the seat part of the seat. The upper end of the ladder, at the upper rung 36, here, is at the upper end 42 of the back and the lower end of the headrest. The cover covers the ladder and the rear of the headrest.

The cover 27 comprises a handle 48 (visible in FIGS. 2 and 6) of conventional type, connected to a locking member 50 (visible in FIGS. 6 and 10) for the cover on the ladder in a closed position, constituting, in particular, means for locking the ladder in rotation.

In the embodiment illustrated, the locking member 50 has the form of an arm 52 articulated at one of its ends in rotation about an axis V of the cover 27. The other end of the arm is in the form of a semicylindrical hook 51 of circular cross section that is able to surround one of the rungs of the ladder and, in the embodiment illustrated, the intermediate rung 34. The hook-shape end of the arm 52 thus forms a latch 50 for fixing the cover resting on the lower rung 32. The concave nature of the hook-shape end of the latch 50 faces downwards and towards the rung 34 that the hook 51 grips. When the hook-shape latch 50 surrounds the rung 34, the cover 27 is held in a closed position and in the embodiment illustrated against the back and the headrest of the seat. The handle 48 of the cover at the upper end of the cover for easy access is connected to the latch 50 by a transmission bar 54. When the handle 48 is actuated from a closed position to an open position, the transmission bar 54 pulls the latch 50 upwards and releases the rung 34. The released cover 27 is then able to pivot in rotation about the axis Z.

The cover 27, and more precisely in the present embodiment illustrated the handle 48 of the cover, is connected by a flexible cable 56 or equivalent (wire, rope, etc.) to the back 20 of the seat. The cable 56 is flexible in order that it can be stored in the cover 27 in a closed position. When the handle 48 is actuated in order to cause the cover 27 to tilt in rotation about the axis Z, the cable 56 stretches until it is completely extended: it then immobilizes the rotation of the cover 27 and retains the upper end thereof, which would tilt under gravity, the lower end of the cover bearing on the axis Z. As it moves away from the back, the upper end of the cover opens up access to the rear of the seat without the cover having to be completely detached. It is thus possible to briefly check in order to verify that everything is in order or, alternatively, to take action in the event of a small problem that can be rectified without a great deal of access.

The end of the cable 56 located on the back side is associated with a device 58 for controlling the deployment of the ladder. Up to a certain level of force, the cable 56 remains in place and this makes it possible, as seen above, to offer access to the rear of the seat. Beyond a specified force, called trigger force threshold, the cable triggers a system 58 for automatic deployment of the ladder. This level of force has to be selected in order for deployment of the ladder not to be triggered by simple tilting of the cover under gravity.

In the embodiment illustrated in FIGS. 7, 11, 13 and 14, the triggering system 58 comprises a deformable clip 60 connected to the cable 56. The clip 60 comprises two deformable branches 62, 64 that move closer together in order to grip, tighten and remain fixed to a shaft 66. Above the trigger force threshold, the clip 60 deforms, the branches 62, 64 move apart from one another and the clip 60 is disconnected from the shaft 66, giving rise to the automatic triggering of deployment of the ladder. This system 58 for triggering deployment of the ladder through the effect of detection of the loss of contact of the clip may have any mechanical, electrical, magnetic, hydraulic, etc. form. In the embodiment illustrated below, the system is mechanical.

The shaft 66 is held in a casing 68 and can move in translation inside the casing. The casing 68 is equipped with an opening 70 allowing the passage of the head 72 of the shaft 66. The head 72 of the shaft 66 is equipped with a groove 74. The head 72 of the shaft projects outside the casing 68, thereby allowing the placing of the clip 60 around the head of the shaft and, more precisely, inside the groove 74. Rings 76, 78 encircle the shaft 66, as will be seen below. The casing 68 comprises a return spring 80 that pulls the shaft 66 such that when the clip 60 is withdrawn the spring 80 entrains the shaft 66 in translation inside the casing 68. The clip 60 held inside the groove 74 is immobilized in translation by an immobilization surface 82 forming part of the casing 68 or separate therefrom and fixed, for example, independently, to the back 20 of the seat. The rings 76, 78 surrounding the shaft 66 are each connected by a cable 84, 86 or equivalent (rope, wire, etc.), which is specific to it, to systems that allow the ladder to be mechanically deployed. When the shaft 66, released by the clip 60 and pulled by the spring 80, moves in a translational manner inside the casing 68, the rings 76, 78 that surround the shaft are released and the systems in question are triggered. In order to allow the passage of the cables 84, 86 inside the casing 68 in the event that the immobilization surface 82 forms part of the casing 68, the casing has a notch 87 offering access to the shaft 66.

Figure 7:
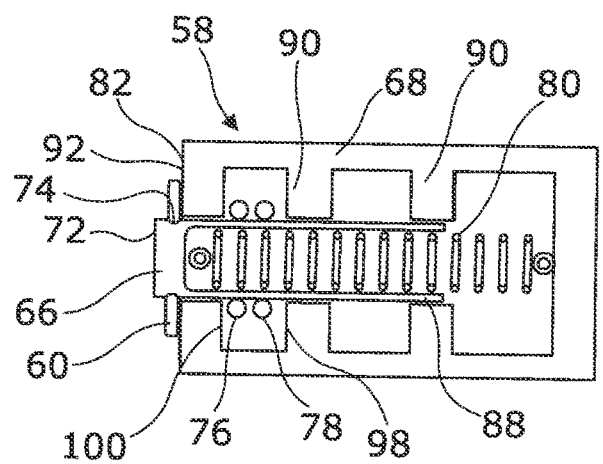
FIG. 7 shows a schematic, simplified side view in longitudinal and central section of the control casing for deployment of the ladder.
Figure 8:
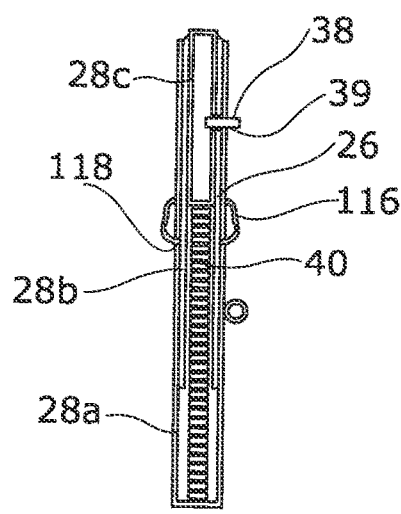
FIG. 8 shows a schematic, simplified side view in longitudinal and central section of the ladder when it is in a retracted, storage position.
Figure 9:
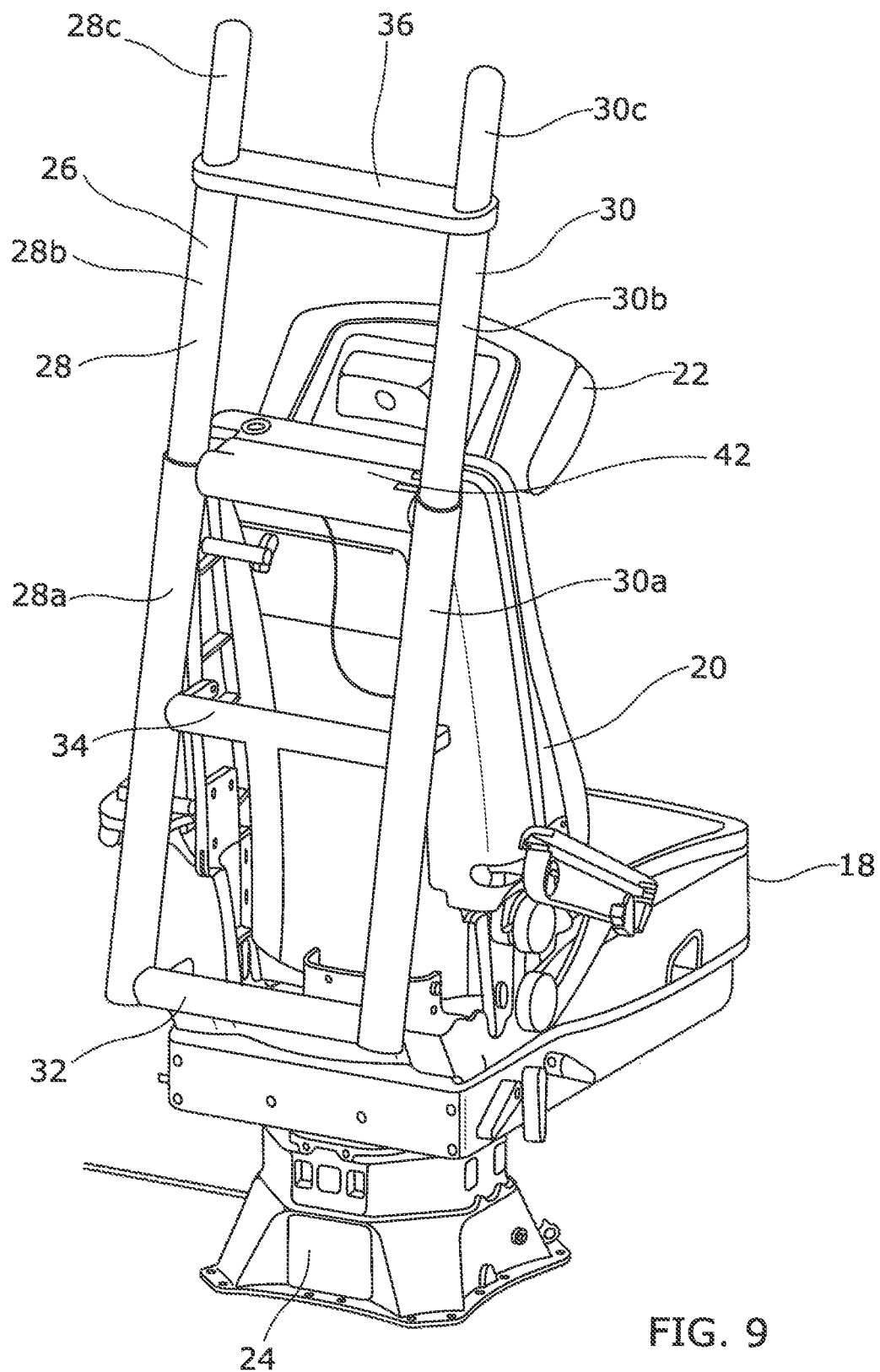
FIG. 9 shows a rear perspective view of a seat according to the present invention, in which the cover has been removed and in which the ladder is deployed and in an evacuation position.
Figure 10:
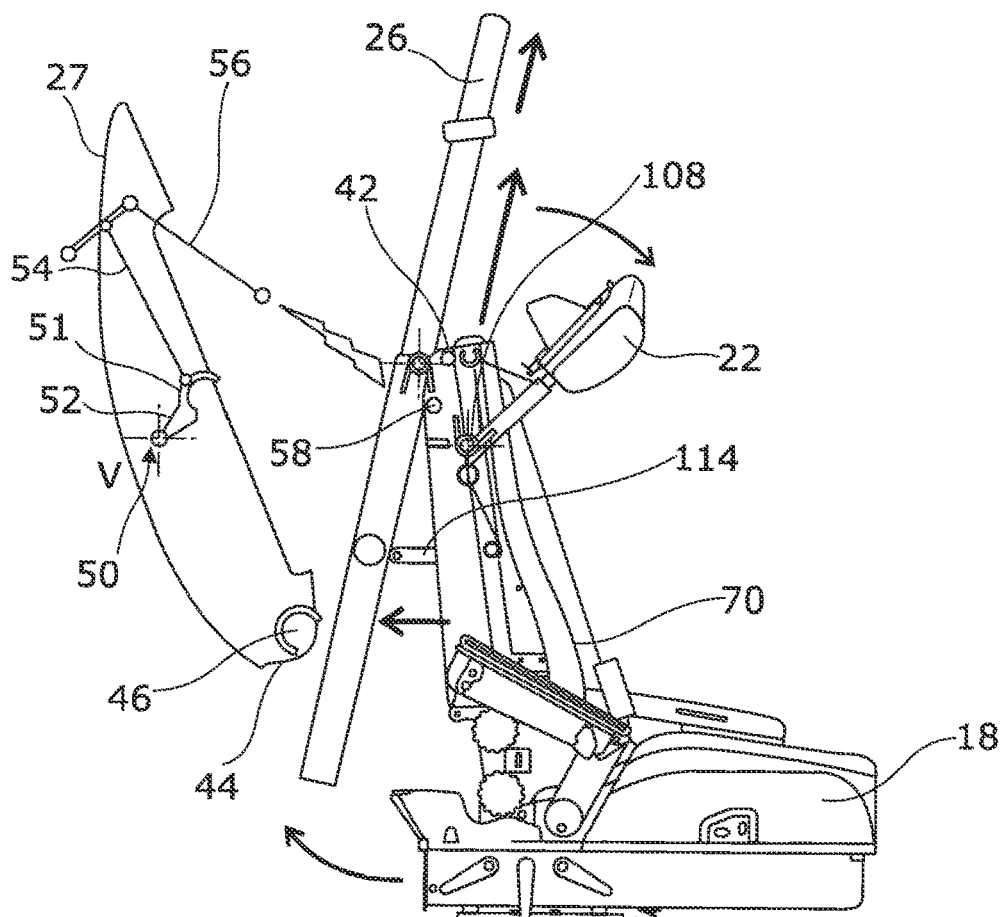
FIG. 10 shows a side plan view of a seat according to the present invention, in which the evacuation device is shown schematically and in a simplified manner in order to illustrate the removal of the cover and the deployment of the ladder.
Figure 11:
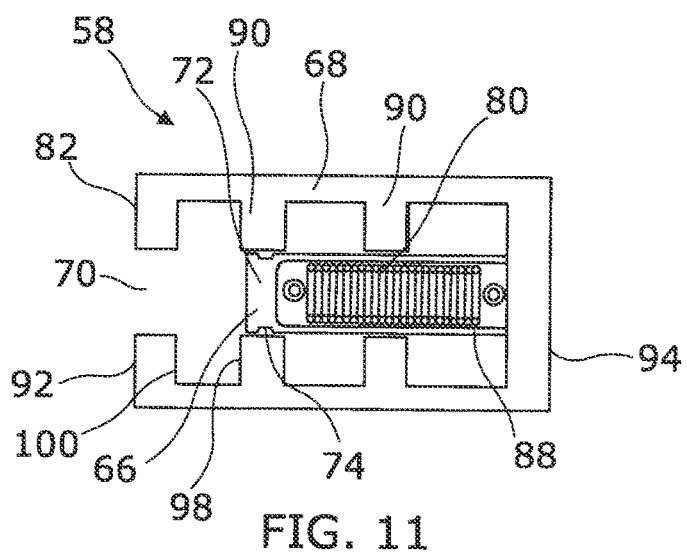
FIG. 11 shows a schematic, simplified side view in longitudinal and central section of the control casing for deployment of the ladder where triggering of deployment has been activated.

In the remainder of the description, an exemplary embodiment will be given of the shaft 66 and of the casing 68 incorporating the immobilization surface 82, illustrated in FIGS. 7 and 11. The shaft 66 has a cylindrical form of circular cross section, one of the ends 88 of which is open such as to form a U in longitudinal section (as in the embodiments of FIGS. 7 and 11) and will be called the "open end." The other, closed end of the shaft constitutes the head 72. The shaft 66 is held in position in the casing 68 in a large number of radial directions of the casing, while allowing the translation thereof in a direction longitudinal to the casing. Although not shown in FIGS. 13 and 14, but shown in FIGS. 7 and 11, the casing 68 has internal vertical guide walls 90 facing one another in pairs, extending from the peripheral internal surface of the casing as far as the shaft 66 in order to hold it in a horizontal position in the central longitudinal direction of the casing. The walls 90 have an end that has a shape corresponding to the exterior shape of the shaft 66, i.e., here, semicircular, in order to partially surround it in order to guide it in its translational movement, but could surround it completely. The casing 68 has a cylindrical form of circular cross section, of which one of the bases 92 forming the immobilization surface 82 has the opening 70 that has a shape corresponding to that of the shaft 66, that is to say, that of a disc, and will be called "front base 92," and of which the opposite base 94 of the casing will be called "rear base:" the head 72 of the shaft can be inserted inside the opening 70 and project outside the casing relative to the surface 82 of the front base. The shaft 66 is movable in translation between a position in which the head 72 is inserted in the opening 70 of the front base 92 of the casing 68 in order to reemerge outside the casing and be held immobile by the clip 60 surrounding it at the groove 74 and is immobilized in abutment against the immobilization surface 82 and a position in which the shaft 66 is retracted inside the casing such as to release the rings 76 and 78.

As seen previously, the casing comprises the notch 87 allowing access to the shaft 66 for the rings 76, 78. In order to prevent the movement of the rings inside the casing 68 and to hold them in the notch 87, the casing is closed on either side of the notch by intermediate vertical walls 98, 100 each having an opening for the passage of the shaft. The intermediate wall 100 closest to the immobilization surface 82 is called "first intermediate wall," the other intermediate wall 98 being called "second intermediate wall." The shaft 66 being hollow, it receives the spring 80 (as in FIGS. 7 and 11), one of the ends of which is connected to the interior surface of the head 72 of the shaft and the other end of which is connected to the rear base 94 of the casing. The spring is stretched such that it draws the shaft towards the rear base 94. The length of the shaft 66 is less than that of the casing 68 such that the shaft is able to slide inside the casing without the open end of the shaft being blocked by the rear base of the casing. The vertical guide walls 90 are positioned at the casing in order to surround the shaft 66 when the shaft is in a position locked by the clip and not to lie between the open end of the shaft and the rear base 94. The rings 76, 78 are positioned around the shaft 66 in the notch 87: when they shaft 66 is unlocked by extraction of the clip 60 it slides inside the casing, drawn by the spring 80 as far as a position such that the rings 76, 78 are released. The shaft 66 moves in the casing at least until the end of the head 72 of the shaft 66 is at the height of the second intermediate wall 98 in order to prevent it retaining the rings 76 and 78. The notch is totally released by the shaft.

One 76 of the rings retained by the shaft 66 of the casing 68 is connected to the headrest 22. The headrest 22 is held in an articulated manner on the back 20 by two rigid rods 102, 104, of which the end opposite that which is associated with the headrest is connected to a shaft 108 of the back constrained by a respective torsion spring 106. The back 20 has two slots of a shape that corresponds with that of the rods such as to accommodate them and, together with the seat part, to form a comfortable unit. The torsion spring 106 is compressed when the headrest 22 is in a use position, that is to say above and in the continuation of the back 20. The torsion spring 106 tends to cause the headrest 22 to tilt in rotation towards the seat part 18 of the seat. When the ring 76 is in place in the casing 68 for triggering deployment, the headrest 22 is retained by the cable 84 connected to the ring 76, which is itself connected to the shaft 66 of the casing 68. The cable 84 is then completely extended and retains the headrest in a position of use of the seat by the pilot, other than in the event of evacuation. When the ring is released, the headrest 22 is no longer held, the torsion spring 106 relaxes and causes the headrest to tilt towards the seat part, thereby releasing the top of the back that will, as seen below, form one of the rungs of the ladder.

Figure 6:
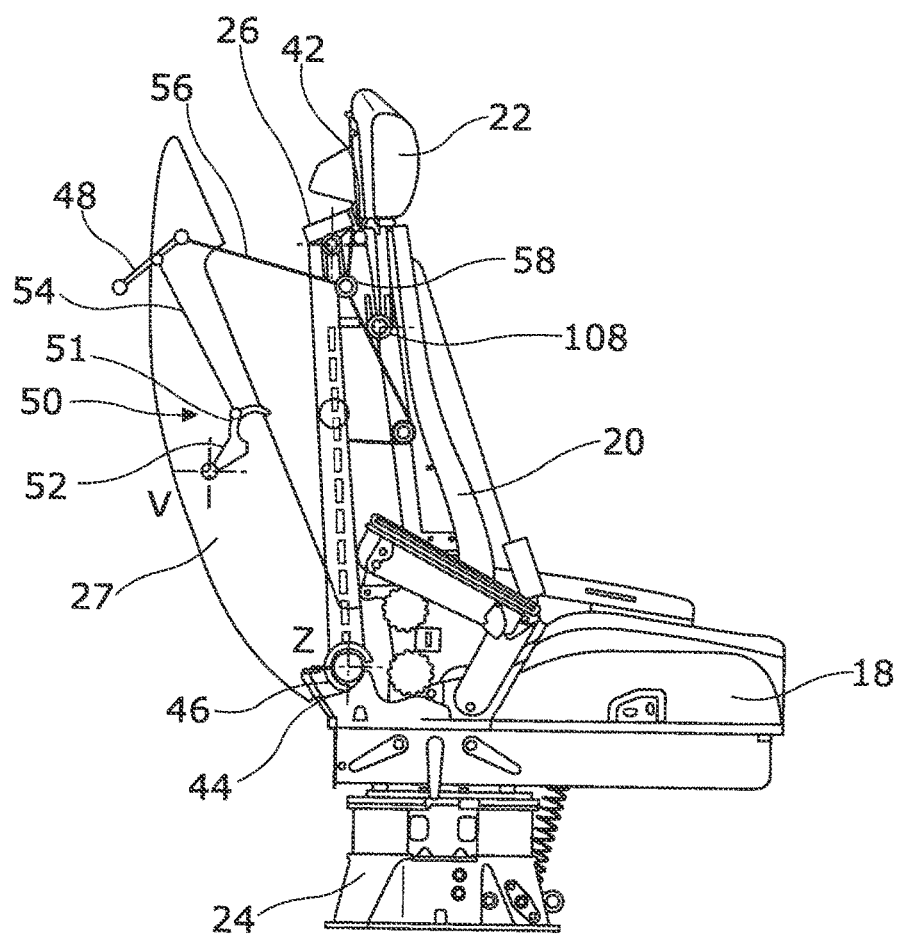
FIG. 6 shows a side plan view of a seat according to the present invention, in which the evacuation device is shown schematically and in a simplified manner in order to illustrate the opening of a cover.

The other ring 78 retained by the casing is connected to the ladder 26. As seen previously, the ladder is articulated in rotation about a shaft 110 connected to the back, and in the embodiment illustrated to the upper end 42 of the back. At least one torsion spring 112 constrains the movement of the ladder in rotation. The spring 112 is connected to the back 20 and to the ladder 26. It is in compression when the ladder 26 is held against the back 20 in a storage position and tends to cause the ladder to pivot about the shaft 110 towards the evacuation position. The ladder 26 is retained by the cable 86 connected to the ring 78 held by the triggering casing. When the ring 78 is released, the ladder 26 is no longer held; the torsion spring 112 relaxes and causes the ladder to pivot about the shaft 110. When the ladder pivots about the upper end of the back, the part of the ladder that is below the shaft 110 moves away from the back and the lug 38 associated with the back 20 withdraws from the uprights 28, 30 of the ladder. The compressed springs 40 inside the uprights of the ladder relax and give rise to the deployment thereof. A connecting rod 114, visible in FIG. 6, is drawn by the tilting of the ladder to which it is fixed in order to be placed in a horizontal immobilization position. The ladder is then retained in its tilting by the connecting rod and locked in position, the reverse movement of the ladder also no longer being possible. The ladder is immobilized by the connecting rod 114, which enables the pilot to use it without risk. Non-return hooks 116 of conventional type, shown in FIGS.

Figure 12:
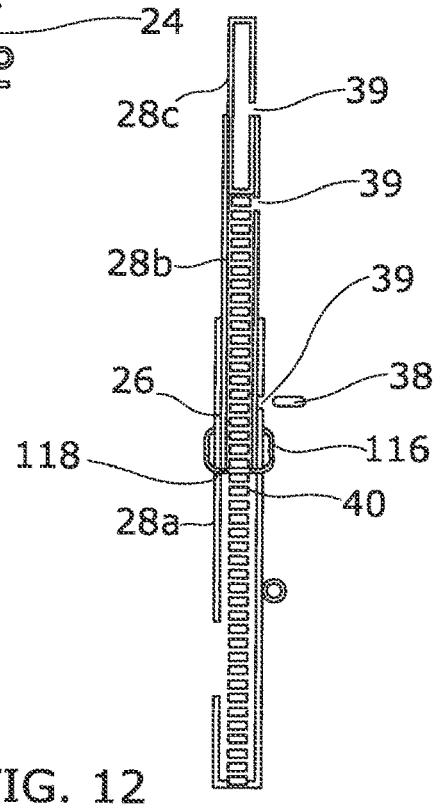
FIG. 12 shows a schematic, simplified side view in longitudinal and central section of the ladder when it is in a deployed evacuation position.
Figure 13:
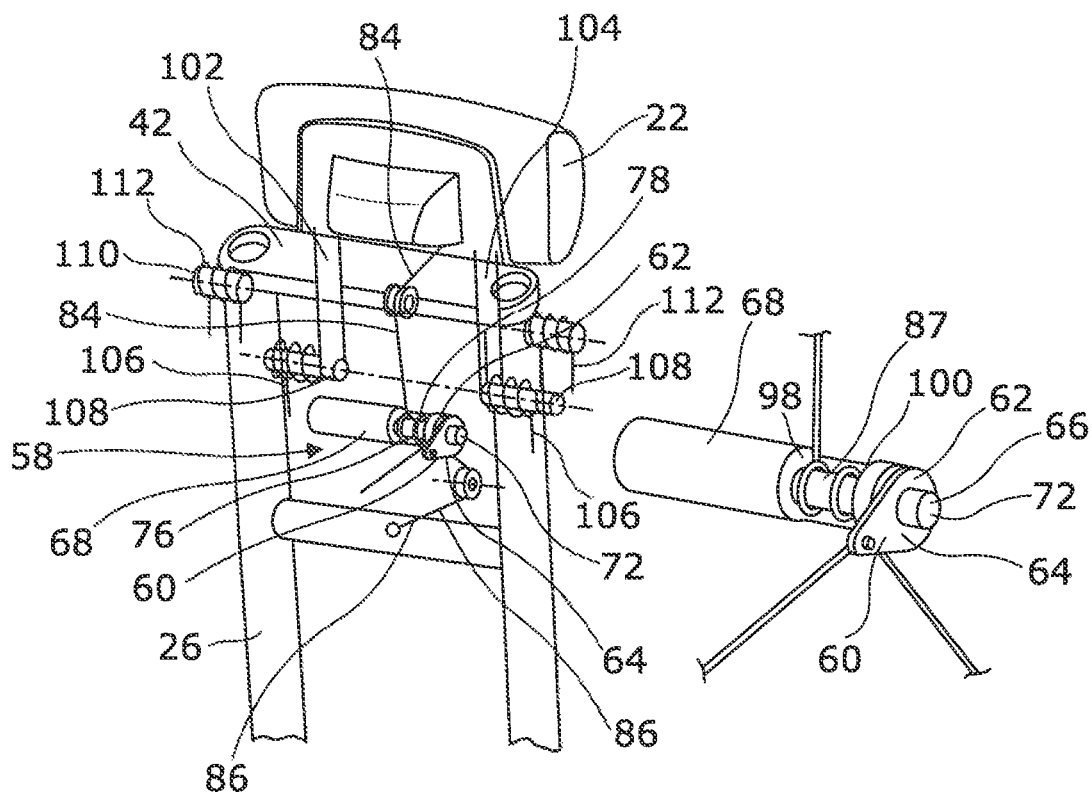
FIGS. 13 and 14 show a partial and schematic perspective view of the top of the seat in order to illustrate the interactions between the control casing for deployment of the ladder and the locking systems of the back and the headrest, respectively, in a storage position and in an evacuation position, the control casing being shown in an enlarged view at the side of the figure.
Figure 14:
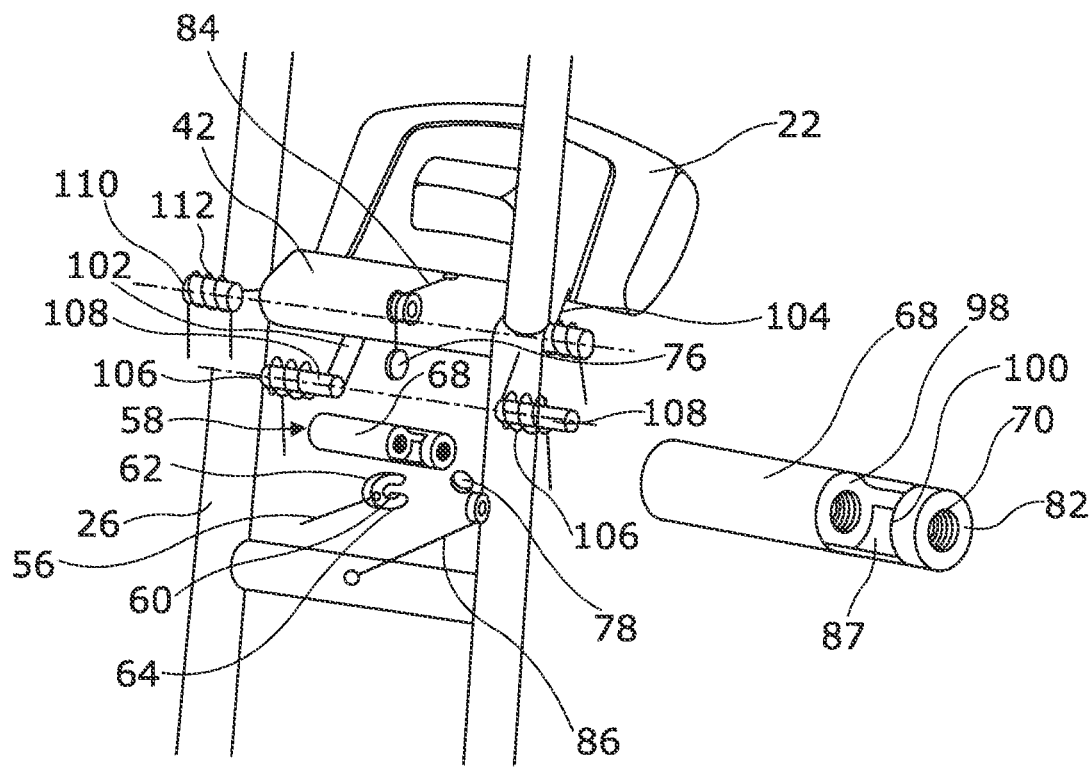

8 and 12, are likewise provided in order to lock the rungs in position once the ladder has been deployed. The end of the hooks 116 is pushed inside holes 118, provided in the exterior rungs 28a, 30a, by springs (not shown). The end of the hooks is then immobilized by the intermediate interior rungs 28b, 30b. When the ladder is deployed and the lower end of the intermediate interior rungs 28b, 30b passes above the holes 118 and thus the ends of the hooks 116 thereby freeing up the passage, the end of the hooks is then pushed such as to be positioned under the intermediate interior rungs, as shown in FIG. 12, and to prevent the reverse movement thereof.

The ladder is composed of the lower 32 and intermediate 34 rungs of the upper end 42 of the back, which acts as rung, and of the upper rung 36. As the seat is voluminous and central, the ladder 26 is easily found in smoke. The seat has an electrical-power input for adjustments, so it is possible to provide illumination of the rear of the seat upon deployment of the ladder using an electrical contact which further facilities its being found by the pilot.

The evacuation device in the form of a deployable ladder accommodated at the rear of the seat allows integration without substantial modification to the seat or to the flight deck. It is completely incorporated into the seat and thus not visible, offering harmonious integration into the environment. The pilot's seat, which has a strong structure, offers a solid base for the evacuation ladder. The dimensions of the device are small. It is easy and user-friendly in use, the pilot not having to seek points of purchase enabling him to access the hatch.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft pilot's seat comprising:
   a seat part,
   a back provided with a headrest,
   a ladder with rungs fixed to the rear of the back and covered by a detachable cover associated with the seat and deployable between a storage position retracted inside the cover and a deployed evacuation position, in which case the cover is detached and the ladder is extended upwards relative to the storage position.

2. The seat according to claim 1, wherein the ladder is provided with uprights comprising tubes nested in one another and is telescopic.

3. The seat according to claim 2, wherein the tubes are locked in a storage position relative to one another by a locking lug inserted in a corresponding opening in the uprights.

4. The seat according to claim 3,
   wherein the ladder is mounted such as to be articulated in rotation at an upper end of the back, the ladder being held in a storage position by a locking system of the ladder, and
   wherein the lug is positioned such that, with the tilting in rotation of the ladder, the lug withdraws therefrom and releases the uprights in order to allow the ladder to deploy.

5. The seat according to claim 4, wherein at least one spring is inserted inside the uprights such that the spring is compressed when the locking lug is in place, in order for a release of the lug to enable the spring to relax, thereby causing the sliding of the uprights relative to one another.

6. The seat according to claim 1, wherein the ladder is deployed automatically, and a triggering of deployment is activated by a mechanical, electrical, magnetic or hydraulic control device.

7. The seat according to claim 6, wherein the cover comprises an opening handle associated with the control device such that removal of the cover triggers the control device.

8. The seat according to claim 7, wherein the cover pivots about an axis in a lower part of the back, the opening handle being connected to a latch fixed to one of the rungs of the ladder to hold the cover in place, and allowing the unlocking of a rotation of the cover, an amplitude of which is limited by a cable retaining the cover in a position offering access to the rear of the back.

9. The seat according to claim 6,
   wherein the ladder is mounted such as to be articulated in rotation at an upper end of the back, the ladder being held in a storage position by a locking system of the ladder,
   wherein the headrest is mounted such as to be articulated in rotation relative to the back of the seat in order to tilt in a direction of the seat part and to release the upper end of the back, the headrest being held in a position of use of the seat by a locking system of the headrest, and
   wherein the control device triggers the tilting of the headrest and the deployment of the ladder.

10. The seat according to claim 6,
    wherein the ladder is mounted such as to be articulated in rotation at an upper end of the back, the ladder being held in a storage position by a locking system of the ladder,
    wherein the headrest is mounted such as to be articulated in rotation relative to the back of the seat in order to tilt in a direction of the seat part and to release an upper end of the back, the headrest being held in a position of use of the seat by a locking system of the headrest, and
    wherein the locking system of the headrest comprises a cable, one end of which is connected to the headrest and an other end of which is connected to a retention device, and wherein the locking system of the ladder comprises a cable, one end of which is connected to the ladder and the other end of which is connected to said retention device, the cables being completely extended when the ladder is in a storage position and the headrest is in a use position, the retention device comprising a system that makes it possible to release the end held by the retention device when a control device is actuated.

11. The seat according to claim 1, wherein the ladder is mounted such as to be articulated in rotation at an upper end of the back, the ladder being held in a storage position by a locking system of the ladder.

12. The seat according to claim 1, wherein the headrest is mounted such as to be articulated in rotation relative to the back of the seat in order to tilt in a direction of the seat part and to release an upper end of the back, the headrest being held in a position of use of the seat by a locking system of the headrest.

13. An aircraft pilot's seat comprising:
a seat part,
a back provided with a headrest,
a ladder with rungs fixed to the rear of the back and covered by a detachable cover associated with the seat and deployable between a storage position retracted inside the cover and a deployed evacuation position, in which case the cover is detached,
wherein the ladder is mounted such as to be articulated in rotation at an upper end of the back, the ladder being held in a storage position by a locking system of the ladder,
wherein the headrest is mounted such as to be articulated in rotation relative to the back of the seat in order to tilt in a direction of the seat part and to release the upper end of the back, the headrest being held in a position of use of the seat by a locking system of the headrest, and
wherein an articulation respectively of the headrest and of the ladder on the back comprises at least one torsion spring in compression which entrains respectively the headrest and the ladder in rotation when the locking system releases the headrest and the ladder.

14. An aircraft comprising:
a flight deck equipped with an aircraft pilot's seat comprising:
a seat part,
a back provided with a headrest,
a ladder with rungs fixed to the rear of the back and covered by a detachable cover associated with the seat and deployable between a storage position retracted inside the cover and a deployed evacuation position, in which case the cover is detached,
an evacuation hatch is arranged in line with the seat, and
a size of the deployed ladder is dimensioned in accordance with a height between the hatch and the pilot's seat.

* * * * *